US009145801B2

United States Patent
Lan et al.

(10) Patent No.: US 9,145,801 B2
(45) Date of Patent: Sep. 29, 2015

(54) SYSTEMS AND METHODS FOR ACOUSTIC RESONANCE MITIGATION

(71) Applicant: The Boeing Company, Chicago, IL (US)

(72) Inventors: Justin Honshune Lan, Bothell, WA (US); Stuart William Vogel, Long Beach, CA (US); Robert L. Cohen, Lake Forest Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 126 days.

(21) Appl. No.: 13/932,819

(22) Filed: Jul. 1, 2013

(65) Prior Publication Data

US 2015/0001003 A1 Jan. 1, 2015

(51) Int. Cl.
*F02C 7/045* (2006.01)
*F01N 1/02* (2006.01)
*B64D 15/04* (2006.01)
*B64D 33/02* (2006.01)

(52) U.S. Cl.
CPC .................. *F01N 1/02* (2013.01); *B64D 15/04* (2013.01); *B64D 2033/0206* (2013.01); *B64D 2033/0233* (2013.01)

(58) Field of Classification Search
CPC ....................................................... F02C 7/045
USPC ......................................................... 181/214
See application file for complete search history.

(56) References Cited

U.S. PATENT DOCUMENTS

| 6,658,839 | B2 * | 12/2003 | Hebert ........................... 60/204 |
| 7,735,601 | B1 * | 6/2010 | Stieger et al. ................. 181/213 |
| 8,341,935 | B2 * | 1/2013 | Marques et al. ................ 60/264 |
| 8,393,567 | B2 * | 3/2013 | Moore et al. .................... 244/55 |
| 8,443,931 | B2 * | 5/2013 | Pilon .............................. 181/215 |
| 8,657,238 | B2 * | 2/2014 | Fox et al. ................... 244/204.1 |
| 2010/0264261 | A1 | 10/2010 | Spakovszky et al. |
| 2011/0167785 | A1 * | 7/2011 | Moore et al. .................... 60/204 |
| 2012/0256049 | A1 * | 10/2012 | Shmilovich et al. .......... 244/1 N |
| 2012/0292441 | A1 | 11/2012 | Drela et al. |
| 2013/0001009 | A1 | 1/2013 | Francisco et al. |
| 2013/0025963 | A1 | 1/2013 | West |

FOREIGN PATENT DOCUMENTS

| EP | 0567277 A1 | 10/1993 |
| EP | 1249393 A2 | 10/2002 |
| EP | 1249394 A2 | 10/2002 |
| EP | 1493912 A1 | 1/2005 |

(Continued)

OTHER PUBLICATIONS

Extended European Search Report of application No. 14171000.4; Dec. 16, 2014; 7 pages.

*Primary Examiner* — Forrest M Phillips
(74) *Attorney, Agent, or Firm* — Armstrong Teasdale LLP

(57) ABSTRACT

Systems and methods for acoustic feedback or resonance mitigation are provided. The systems and methods include an exhaust acoustic noise reduction apparatus having an exhaust port comprising an exhaust aperture, a first vane extending at least partially across the exhaust aperture, and a second vane extending at least partially across the exhaust aperture and intersecting the first vane, such that the first and second vanes are oriented to interfere with formation of an acoustic feedback loop and reduce an acoustic noise signature of the exhaust port.

20 Claims, 4 Drawing Sheets

(56) References Cited

FOREIGN PATENT DOCUMENTS

| EP | 2551195 | A2 | 1/2013 |
|----|---------|----|--------|
| EP | 2578495 | A2 | 4/2013 |
| FR | 2461136 | A1 | 1/1981 |
| GB | 571761 | A | 9/1945 |
| WO | 2012075844 | A1 | 6/2012 |

* cited by examiner ns and methods for acoustic resonance mitigation

BACKGROUND

The field of the disclosure relates generally to acoustic mitigation, and more specifically, to methods and systems for mitigating acoustic resonance associated with exhaust ports.

Generally, as air travels over an aperture, noise may be generated that corresponds to an acoustic resonance associated with the geometry of the aperture, an air cavity associated with the aperture, and/or air flow characteristics. In some known apertures, air flow moving over an aperture is separated from the leading edge of the aperture and takes the form of a shear layer and vortices. The separated flow impacts the trailing edge of the aperture which then generates an acoustic wave that travels upstream and interacts with the flow separation mechanism which ultimately forms an acoustic feedback loop. This feedback loop can excite the acoustic resonances of the air cavity and result in undesirably high noise levels. Some known vehicles (e.g. aircraft) may include apertures or ports on the exterior of the vehicle for exhausting air or fluid from within the vehicle which can exhibit the undesirable acoustic resonance phenomena.

BRIEF DESCRIPTION

In one aspect, an exhaust acoustic noise reduction apparatus is provided. The exhaust acoustic noise reduction apparatus includes an exhaust port comprising an exhaust aperture, a first vane extending at least partially across the exhaust aperture, and a second vane extending at least partially across the exhaust aperture and intersecting the first vane, such that the first and second vanes are oriented to interfere with formation of an acoustic feedback loop and reduce an acoustic noise signature of the exhaust port.

In another aspect, a vehicle is provided. The vehicle includes an engine having a housing and an exhaust port coupled to the housing. The exhaust port includes an exhaust aperture, a first vane extending at least partially across the exhaust aperture, and a second vane extending at least partially across the exhaust aperture and intersecting the first vane, such that the first and second vanes are oriented to interfere with formation of an acoustic feedback loop and reduce an acoustic noise signature of the exhaust port.

In yet another aspect, a method of operating a vehicle including an exhaust port coupled to the vehicle is provided. The method includes coupling the exhaust port to the vehicle, wherein the exhaust port includes a first vane extending at least partially across the exhaust aperture and a second vane extending at least partially across the exhaust aperture and intersecting the first vane, such that the first and second vanes are oriented to interfere with the formation of the acoustic feedback loop and reduce the acoustic noise signature of the exhaust port; and exhausting a portion of at least one of air and fluid from the exhaust port.

The features, functions, and advantages that have been discussed can be achieved independently in various embodiments or may be combined in yet other embodiments, further details of which can be seen with reference to the following description and drawings.

DETAILED DESCRIPTION

The systems and methods described herein facilitate reducing an acoustic noise signature of an exhaust port of a vehicle. As used herein, the term "vehicle" or "aircraft" may include, but is not limited to only including, airplanes, unmanned aerial vehicles (UAVs), gliders, helicopters, and/or any other object that travels through airspace. As used herein the terms "noise", "acoustic resonance", "acoustic noise", or "acoustic noise signature" are the sounds produced by vibrations resulting from a feedback loop in which portions of an air flow are separated and impacts a downstream surface which produces acoustic pressure waves that travel upstream and interact with the flow separation mechanism.

Figure 1:
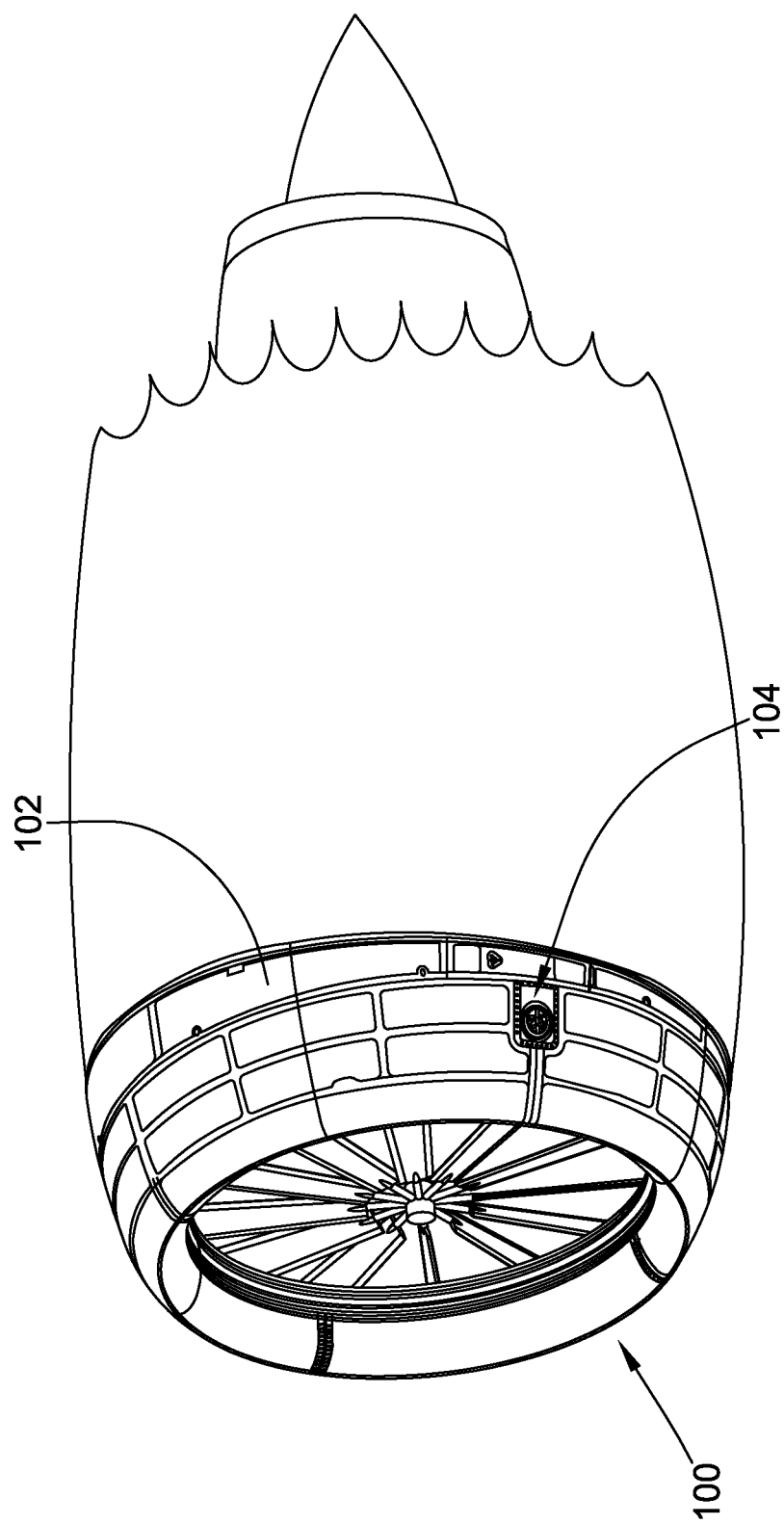
FIG. 1 is a perspective view of an exemplary engine.

FIG. 1 is a perspective view of an exemplary engine 100 for use with an aircraft. Engine 100 includes a housing or nacelle 102 that substantially covers and directs airflow through and around engine 100. Housing 102 includes an exhaust port 104 configured to exhaust air and/or fluid flow from within housing 102. In one embodiment, engine 100 is a turbofan jet engine, however, engine 100 can be any engine having an exhaust port as described herein. In the exemplary embodiment, exhaust port 104 is an anti-ice exhaust port for exhausting air used to heat housing 102. Similar exhaust ports 104 may exist on other surfaces such as an aircraft wing surface.

Figure 2:
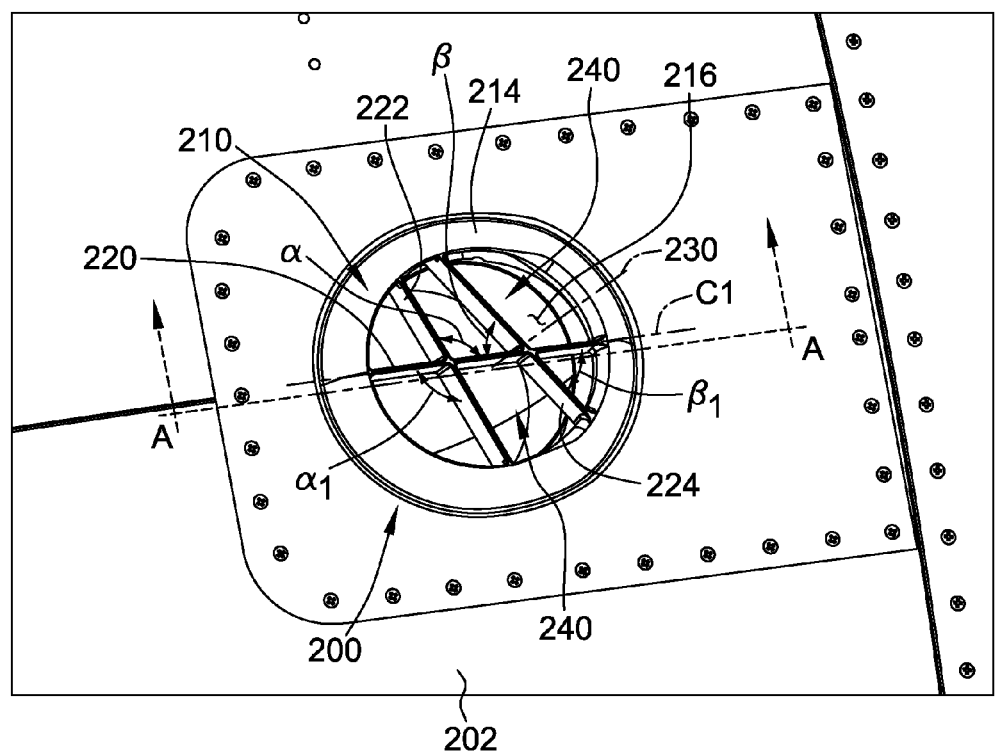
FIG. 2 is perspective view of an exemplary exhaust port that may be used with the engine shown in FIG. 1.
Figure 3:
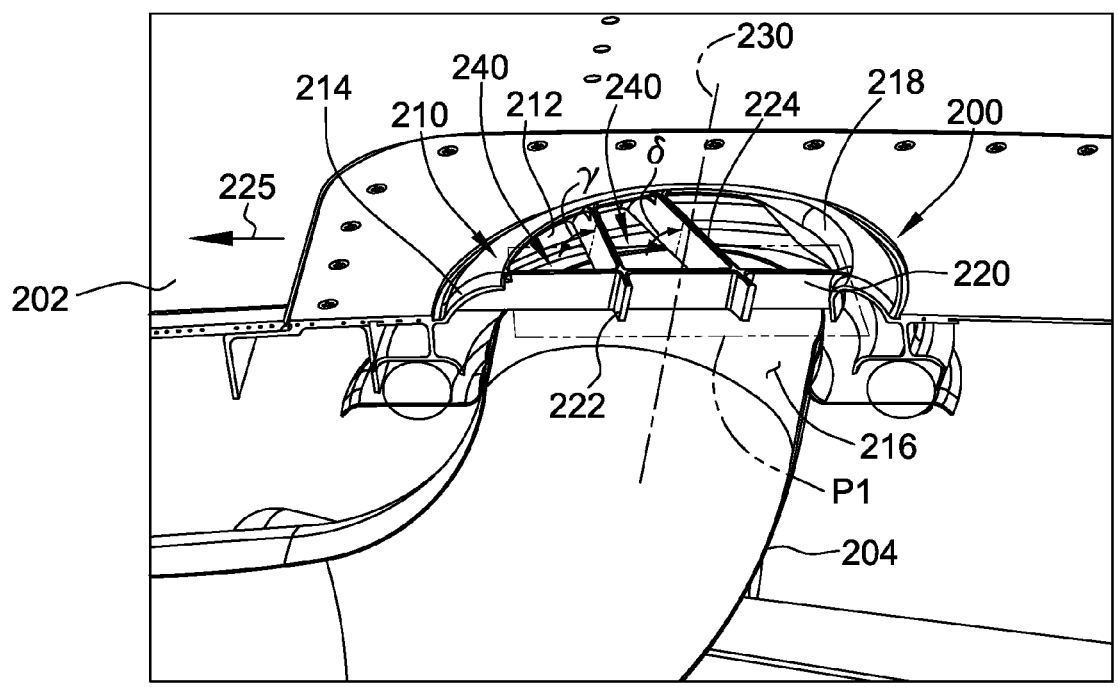
FIG. 3 is a sectional view of the exhaust port shown in FIG. 2.

FIG. 2 is perspective view of an exemplary exhaust port 200, such as port 104 (shown in FIG. 1), that may be used with engine 100. FIG. 3 is a sectional view of exhaust port 200 (shown in FIG. 2) taken along line A-A. In the exemplary embodiment, port 200 is coupled to an engine housing 202, such as housing 102, (shown in FIG. 1) and an exhaust duct 204. In one embodiment, exhaust duct 204 is an anti-ice exhaust duct that is a portion of an anti-ice system (not shown) configured to prevent ice formation on and around housing 202. The anti-ice system is configured to bleed hot air from engine 100 into cavities in the leading edge of engine housing 202 and/or cavities in the leading edge of the wings such that the bleed air will heat the leading edges to keep ice from forming. Exhaust ducts (e.g., duct 204), positioned within housing 202 and/or the wings, allow the hot bleed air to exhaust from the leading edge cavities to the outside or ambient environment through port 200.

In the exemplary embodiment, port 200 includes a flange 210 extending from housing 202. Flange 210 has an external surface of a torus and includes an inner surface 212 and an outer surface 214. Alternatively, flange 210 can have any shape that facilitates reducing noise as described herein. In one embodiment, outer surface 214 is substantially smooth to reduce turbulence resulting from air travelling over surface 214. Flange 210 circumscribes an exhaust port aperture 216 for channeling exhaust from the anti-ice system. In one embodiment, flange 210 interfaces aperture 216 at a horizontal flange plane P1. In the exemplary embodiment, aperture 216 is 5" in diameter. Alternatively, aperture 216 can have any size. In one embodiment, a portion 218 of inner surface 212 includes a convex lip extending from surface 212, forming a substantially toroidal surface. In such an embodiments, portion 218 is positioned in the substantially aft direction of port 200 to substantially prevent downstream vortex shedding and minimize acoustic reflection upstream. In one embodiment, inner surface 212 is substantially smooth such that surface 212 is free from perceptible projections or indentations.

Alternatively, portion 218 can have any shape that facilitates noise reduction as described herein.

In the exemplary embodiment, port 200 includes a first vane 220 extending at least partially across aperture 216 and coupling to flange 210. In one embodiment, first vane 220 includes a vane centerline C1 and is positioned substantially in a forward-aft orientation. Port 200 includes a second vane 222 and a third vane 224 that each extend across aperture 216 and intersect first vane 220. In one embodiment, second and third vanes 222 and 224 are tilted or angled in an aft direction 225 to channel exhaust towards an aft portion of aperture 216. In such an embodiment, the tilt of second vane 222 creates an angle γ between vane 222 and horizontal flange plane P1. Similarly the tilt of third vane 224 creates an angle δ between vane 224 and horizontal flange plane P1. In the exemplary embodiment, angle γ and angle δ are 70° angles. Alternatively, angles γ and δ can be any angle and/or positioned in any manner that facilitates noise reduction as described herein. Although vanes 220, 222, and 224 are shown as extending through aperture 216, any or all of vanes 220, 222, and 224 can be oriented in such a manner that only a portion of a vane extends into aperture 216.

Vanes 220, 222, and 224 are positioned within aperture 216 such that vanes 220, 222, and 224 substantially break up coherence of the acoustic feedback loop regardless of orientation of an exterior flow passing over port 200. As such, vanes 220, 222, and 224 are positioned such that asymmetrical flow channels 240 are created by vanes 220, 222, and 224 and inner surface 212. In some embodiments, asymmetrical flow channels 240 are formed by an intersection of two of vanes 220, 222, and 224 lying outside of centerline C1. For example, first vane 220 and second vane 222 intersect at a point lying outside of centerline C1 as well as an intersection of first vane 220 and third vane 224.

In the exemplary embodiment, second and third vanes 222 and 224 are oriented such that vanes 222 and 224 are not positioned parallel to one another. Second and third vanes 222 and 224 are positioned such that first vane 220 does not intersect second and third vanes 222 and 224 at port centerline 230. Such an orientation creates an asymmetrical pattern in channels 240. In the exemplary embodiment, varying angles are formed between second vane 222 and centerline C1 as well as third vane 224 and centerline C1 due to the asymmetrical pattern. For example, angle α formed between second vane 222 and centerline C1 is 100° and angle β formed between third vane 224 and centerline C1 is 45°. Alternatively, angles α and β can be any angle and/or positioned in any asymmetrical manner that facilitates noise reduction as described herein. As such, any number of vanes can be used and positioned in any manner that facilitates reducing noise as described herein. In some embodiments, second vane 222 and third vane 224 are bisected by vane 220 such that vanes 222 and 224 do not have a continuous centerline across aperture 216. For example, in such an embodiment, angle α and angle α1 would not have identical angles and angle β would not be identical to β1.

Figure 4:
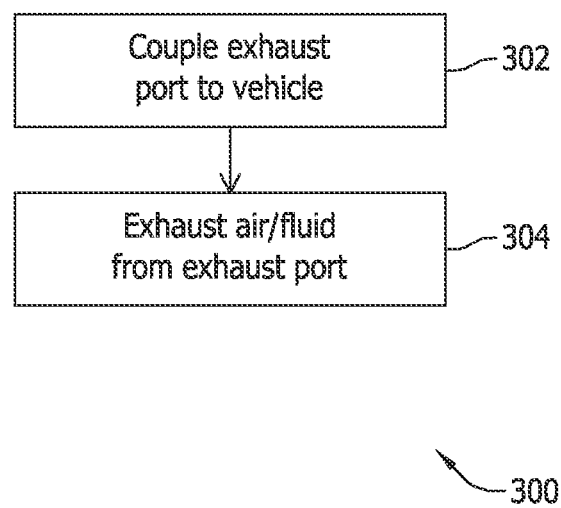
FIG. 4 is an exemplary flowchart of a method of operating a vehicle.

FIG. 4 is an exemplary flowchart of a method 300 of operating a vehicle including exhaust port 200 (shown in FIG. 2) coupled to the vehicle. In the exemplary embodiment, the vehicle utilized in method 300 is an aircraft. Alternatively, the vehicle can be any vehicle that provides an exhaust. Method 300 includes coupling 302 exhaust port 200 to the vehicle. In some embodiments, exhaust port 200 includes first vane 220 extending at least partially across exhaust aperture 216 and second vane 222 extending at least partially across exhaust aperture 216 and intersecting first vane 220, such that first and second vanes 220 and 222 are oriented to interfere with formation of an acoustic feedback loop and reduce an acoustic noise signature of exhaust port 200. Method 300 also includes exhausting 304 a portion of at least one of air and fluid from exhaust port 200.

In some embodiments, exhaust port 200 coupled 302 to the vehicle includes at least one of first vane 220 and second vane 222 a least partially oriented in an aft direction. In one embodiment, port 200 coupled to the vehicle includes first vane 220 intersecting second vane 222 at a location lying outside centerline C1 and third vane 224 intersects first vane 220. In such an embodiment, third vane 224 is non-parallel to second vane 222 and first and second vanes 220 and 222 are oblique. In the exemplary embodiment, port 200 coupled to the vehicle includes flange 210 having inner surface 212 and outer surface 214, wherein at least a portion 218 of the inner surface 212 is substantially smooth and partially convex.

The embodiments described herein enable or facilitate reducing an acoustic noise signature of an exhaust port. The embodiments described herein provide methods and systems for reducing and/or eliminating tone noise radiating from an exhaust port regardless of the flow orientation over the exhaust port. Although specific features of various embodiments of the invention may be shown in some drawings and not in others, this is for convenience only. In accordance with the principles of the invention, any feature of a drawing may be referenced and/or claimed in combination with any feature of any other drawing. Although aircraft have been used as an example throughout, it is contemplated that other vehicles, such as electric and/or motor vehicles (e.g., car and truck), maritime vehicles, and/or spacecraft may be used with the methods and systems described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An exhaust acoustic noise reduction apparatus comprising:
   an exhaust port comprising a flange that defines an exhaust aperture;
   a first vane extending at least partially across the exhaust aperture from a first point on the flange to a second point on the flange; and
   a second vane extending at least partially across the exhaust aperture and intersecting the first vane, such that the first and second vanes are oriented to interfere with formation of an acoustic feedback loop and reduce an acoustic noise signature of the exhaust port.

2. An exhaust acoustic noise reduction apparatus according to claim 1, wherein at least one of the first vane and the second vane are oriented at least partially in an aft direction to facilitate channeling exhaust at least partially in an aft direction.

3. An exhaust acoustic noise reduction apparatus according to claim 1, wherein the first vane intersects the second vane at a location outside of an exhaust port centerline, such that the first and second vanes are oblique.

4. An exhaust acoustic noise reduction apparatus according to claim 1, wherein the flange includes an inner surface and an outer surface, wherein at least a portion of the inner surface is substantially smooth.

5. An exhaust acoustic noise reduction apparatus according to claim 4, wherein at least a portion of the inner surface of the flange is at least partially convex.

6. An exhaust acoustic noise reduction apparatus according to claim 1, further comprising a third vane coupled within the exhaust aperture and intersecting the first vane, wherein the third vane is non-parallel to the second vane.

7. An exhaust acoustic noise reduction apparatus according to claim 6, wherein the first vane intersects the third vane at a location lying outside of an exhaust port centerline.

8. A vehicle comprising:
an engine having a housing; and
an exhaust port coupled to the housing, the exhaust port comprising:
  a flange defining an exhaust aperture;
  a first vane extending at least partially across the exhaust aperture and coupled to the flange such that the first vane is fixed relative to the exhaust aperture; and
  a second vane extending at least partially across the exhaust aperture and intersecting the first vane, such that the first and second vanes are oriented to interfere with formation of an acoustic feedback loop and reduce an acoustic noise signature of the exhaust port.

9. A vehicle according to claim 8, wherein at least one of the first vane and the second vane are oriented at least partially in an aft direction.

10. A vehicle according to claim 8, wherein the first vane intersects the second vane at a location lying outside of an exhaust port centerline, such that the first and second vanes are oblique.

11. A vehicle according to claim 8, wherein the flange includes an inner surface and an outer surface, wherein at least a portion of the inner surface is substantially smooth.

12. A vehicle according to claim 11, wherein at least a portion of the inner surface of the flange is at least partially convex.

13. A vehicle according to claim 8, further comprising a third vane coupled within the exhaust aperture and intersecting the first vane, wherein the third vane is non-parallel to the second vane.

14. A vehicle according to claim 13, wherein the first vane intersects the third vane at a location outside of an exhaust port centerline.

15. A method of operating a vehicle, the method comprising:
coupling an exhaust port to the vehicle, wherein the exhaust port defines an exhaust aperture and includes (i) a first vane extending at least partially across the exhaust aperture and configured to remain fixed relative to the exhaust aperture, and (ii) a second vane extending at least partially across the exhaust aperture and intersecting the first vane, such that the first and second vanes are oriented to interfere with the formation of the acoustic feedback loop and reduce the acoustic noise signature of the exhaust port; and
exhausting a portion of at least one of air and fluid from the exhaust port.

16. A method according to claim 15, wherein coupling the exhaust port to the vehicle further comprises coupling the exhaust port to the vehicle wherein the exhaust port includes at least one of the first vane and the second vane a least partially oriented in an aft direction.

17. A method according to claim 15, wherein coupling the exhaust port to the vehicle further comprises coupling the exhaust port to the vehicle wherein the first vane intersects the second vane at a location lying outside of an exhaust port centerline, such that the first and second vanes are oblique.

18. A method according to claim 15, wherein coupling the exhaust port to the vehicle further comprises coupling the exhaust port to the vehicle wherein the exhaust port includes a third vane coupled within the exhaust aperture and intersecting the first vane, wherein the third vane is non-parallel to the second vane.

19. A method according to claim 15, wherein coupling the exhaust port to the vehicle further comprises coupling the exhaust port to the vehicle wherein the exhaust port includes a flange defining the exhaust aperture, the flange including an inner surface and an outer surface, wherein at least a portion of the inner surface is substantially smooth.

20. A method according to claim 19, wherein coupling the exhaust port to the vehicle further comprises coupling the exhaust port to the vehicle wherein at least a portion of the inner surface of the flange is at least partially convex.

\* \* \* \* \*